United States Patent [19]
Goll

[11] Patent Number: 5,193,625
[45] Date of Patent: * Mar. 16, 1993

[54] TRACTOR DRAWBAR HITCH ADAPTOR

[76] Inventor: Charles J. Goll, 1902 Highway D, Marthasville, Mo. 63357

[*] Notice: The portion of the term of this patent subsequent to May 5, 2009 has been disclaimed.

[21] Appl. No.: 877,859

[22] Filed: May 4, 1992

Related U.S. Application Data

[63] Continuation-in-part of Ser. No. 690,636, Apr. 24, 1991, Pat. No. 5,109,931.

[51] Int. Cl.$^5$ ............................................. B60D 1/00
[52] U.S. Cl. ................................... 172/248; 172/677; 280/416.1
[58] Field of Search ............... 172/248, 677, 776, 679, 172/741, 272; 280/515, 416.1, 511, 416.3

[56] References Cited

U.S. PATENT DOCUMENTS

| | | | |
|---|---|---|---|
| 2,444,876 | 7/1948 | Kuhl | 280/515 X |
| 2,654,613 | 10/1953 | Blair et al. | 280/515 |
| 2,912,258 | 11/1959 | Maughan | 172/248 |
| 3,471,171 | 10/1969 | Peterson, Jr. et al. | 280/515 X |
| 3,693,725 | 9/1972 | Tonsfeldt | 172/741 X |
| 3,951,434 | 4/1976 | Sause | 280/416.1 |
| 4,394,031 | 7/1983 | Barton et al. | 280/515 |
| 4,783,094 | 11/1988 | Sands | 280/515 |

FOREIGN PATENT DOCUMENTS 79484 12/1919 Austria ............................... 280/416.1

Primary Examiner—Dennis L. Taylor
Assistant Examiner—Jeffrey L. Thompson
Attorney, Agent, or Firm—Robbins & Robbins

[57] ABSTRACT

A hitch is provided for standard tractor drawbars having one or more hitch pin holes. The hitch is connected to the bar by an adaptor mounting bracket and has a pivot pin which permits the hitch to be rotated over the rear hole in proper registry to receive an implement tongue between the drawbar and the hitch. The adaptor mounting bracket provides for mounting the bracket adjustability to fit different sizes of drawbars. The hitch may be disengaged by lifting a hitch lock from locked engagement in relation to the drawbar and simply rotating the hitch to a forward position over the drawbar to clear the rear drawbar hole for conventional use. The lock is pivotally mounted on a horizontal axis on the hitch and may be lifted upwardly to permit movement of the hitch.

12 Claims, 2 Drawing Sheets

TRACTOR DRAWBAR HITCH ADAPTOR

RELATED APPLICATION

This application is a continuation-in-part of my copending application Ser. No. 07/690,636, filed Apr. 24, 1991 now U.S. Pat. No. 5,109,931; granted May 5, 1992.

BACKGROUND OF THE INVENTION

Drawbars for farm tractors have been conventionally provided in the past which extend axially to the rear of the tractor for connecting various types of implements. A standard drawbar has two holes at the rear but may in some cases have only one hole, or two or more holes at different spacings. The rear hole receives standard pins for connection to an implement tongue, clevises or the like.

With the advent of heavier and different types of implements a captured ring in the implement tongue has been designed to reduce wear, this desirably requires a yoke or U-shaped fitting at the end of the drawbar to receive the implement tongue between the drawbar and the fitting. The usual connecting pin fits through registering holes in the drawbar, the implement tongue and the hitch fitting.

Such fittings in the past while working well for a particular implement provided with the capturing ring hitch require special tools and connections to the drawbar. Specially drilled holes in the drawbar may be required and the fittings can not be readily adapted to leave one hole of the drawbar free for use with implements having a tongue with a simple hole not requiring the yoke or U-shaped fittings or implements having a yoke type fitting at the end of the tongue.

SUMMARY OF THE INVENTION

By means of this invention there has been provided a hitch for tractor drawbars which can be simply moved from an engaged position overlying the drawbar pin receiving hole to form a U-shaped to a disengaged position leaving the drawbar hole free for other usage.

The hitch is simply attached to the drawbar by an adjustable mounting bracket which fits over drawbars of varying widths and thicknesses. A lock connected to the hitch permits the hitch to be locked in the hitch engaged and hitch disengaged positions. By lifting the lock, the hitch is simply rotated between the two positions with the lock being dropped to prevent movement of the hitch.

The hitch is comprised of a Z-shaped plate in the form of a strap having a base supported upon the drawbar for pivotal movement. The base is connected by an upstanding web to a hitch plate having a pin receiving hole which is adjustable by the mounting bracket to be in registry with the standard rear hole in the drawbar when the hitch is in the engaged position. The base of the hitch is pivotally connected to the mounting bracket in order that it can be moved back and forth between the hitch engaged and disengaged positions.

In the hitch engaged position, a U-shaped yoke is formed with the drawbar which receives a tongue of an implement by a connecting pin. This form of yoke hitch is especially useful for implements having a captured ring hitch. When the hitch is moved from the engaged position to the disengaged position, the hitch plate closely overlies the drawbar to provide a compact and clear structure and minimize any protuberances that might cause entanglement or the like.

A lock is provided which may be simply lifted out of engagement with the drawbar to permit the rotation of the hitch between the engaged and disengaged positions. The lock is pivotally connected on a horizontal axis to the hitch and has a pair of lock plates which provide the lock engaged position. The lock is simply lifted to disengage the lock plates for unlocking and then dropped into the locked position.

The hitch is easily fitted to existing drawbars of varying widths and thicknesses. It provides a simple and efficient structure for adapting the drawbar to a U-shaped yoke type hitch when in the hitch engaged position or when disengaged, permitting the use of the drawbar with the rear hole cleared for conventional use. The hitch is rugged, simple to use and attach to a tractor drawbar and by being made of standard components is of relatively low cost.

The above features are objects of this invention. Further objects will appear in the detailed description which follows and will be otherwise apparent to those skilled in the art.

For purpose of illustration of this invention a preferred embodiment is shown and described hereinbelow in the accompanying drawing. It is to be understood that this is for the purpose of example only and that the invention is not limited thereto.

IN THE DRAWINGS

DESCRIPTION OF THE INVENTION

Figure 1:
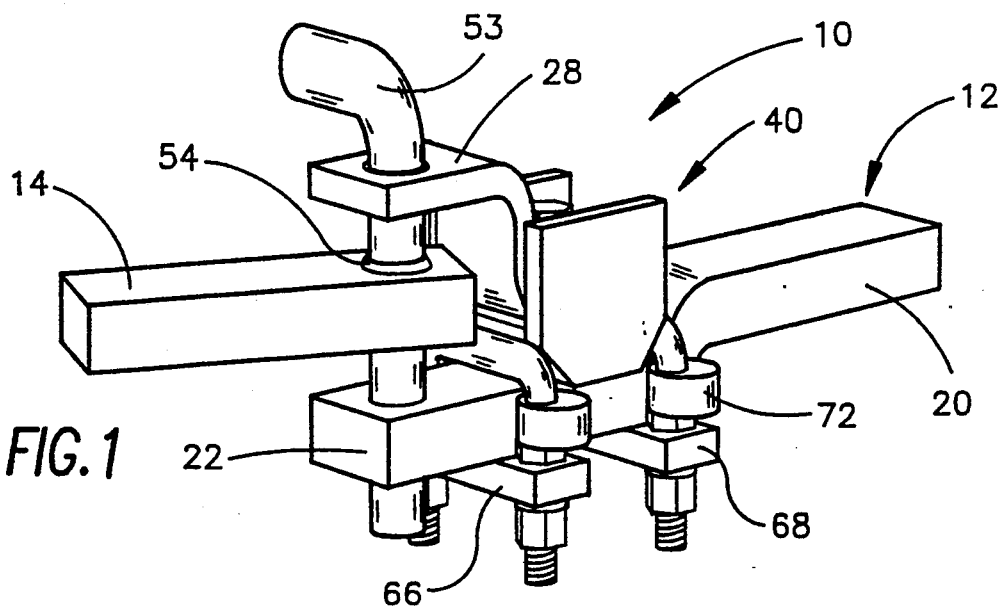
FIG. 1 is a pictorial view showing the hitch in the engaged position.

The hitch of this invention is generally indicated by the reference numeral 10, such as in FIG. 1, where it is shown attached to a tractor drawbar 12 receiving the front end of the tongue 14 attached to an implement of one type or another (not shown). The hitch is shown in the engaged position while in FIG. 2 it is shown in the disengaged position to leave a rear opening 16 of the drawbar clear for use with other types of connections such as a tongue having a U-shaped front end, a clevis or other standard usages.

Figure 4:
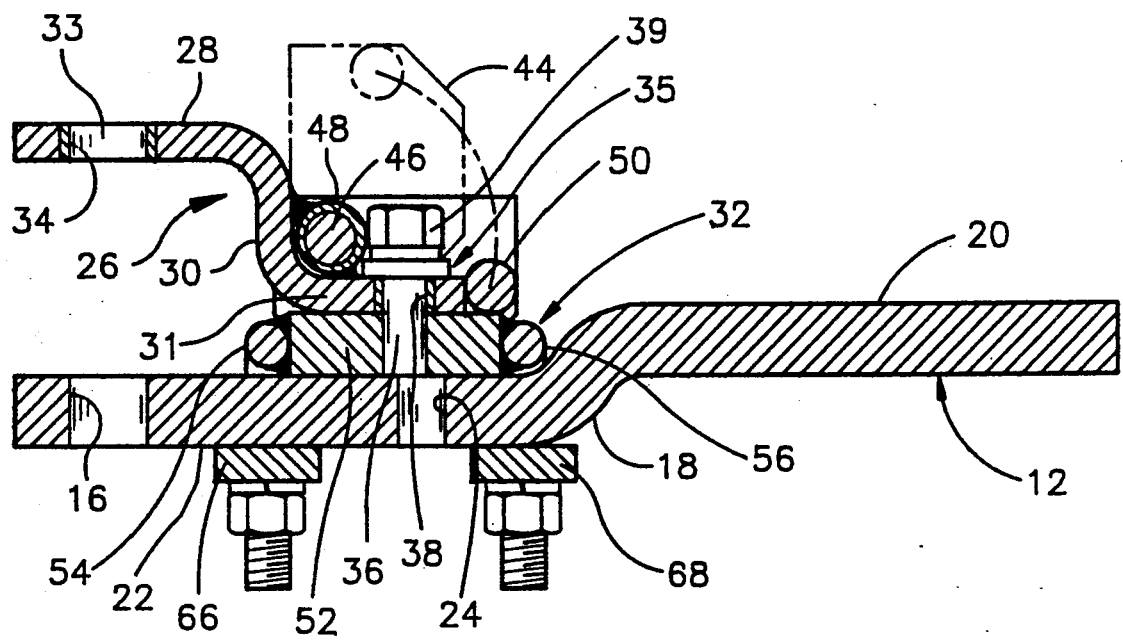
FIG. 4 is a view in vertical section on the longitudinal axis of the hitch.
Figure 5:
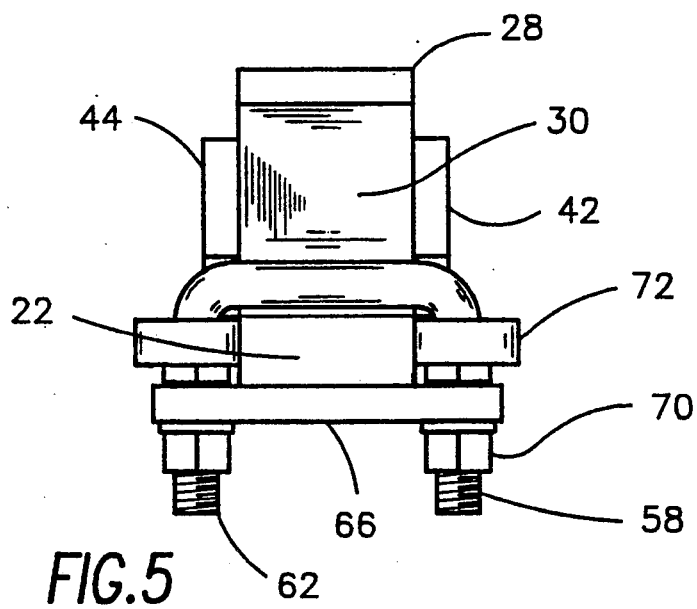
FIG. 5 is a view in front elevation of the hitch.
Figure 6:
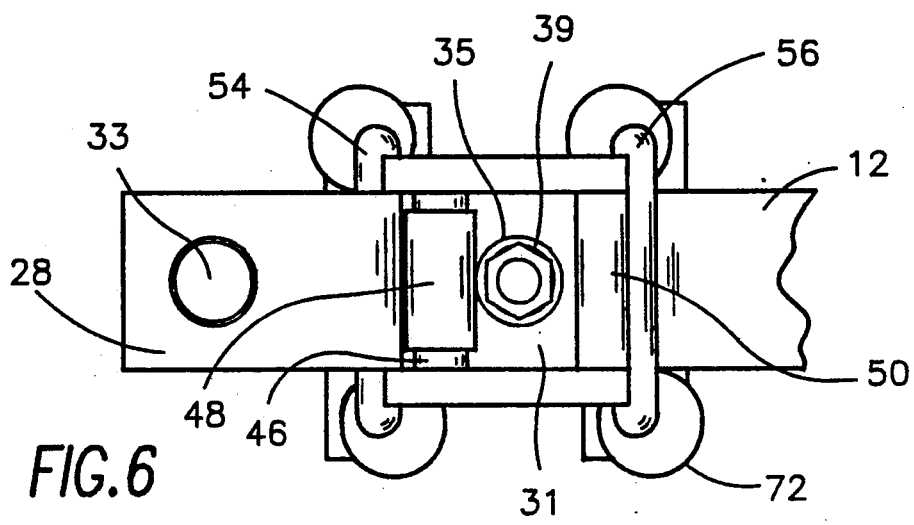
FIG. 6 is a top plan view.

The drawbar with which the hitch 10 is employed is of standard construction which may be straight or one having a bend 18 connecting a forward end 20 to the tractor (not shown) and a rear end 22 provided with the usual rear opening 16 and a forward opening 24 to which the hitch 10 is connected, as best shown in FIG. 4.

The hitch is comprised of a Z-shaped hitch plate 26 having a hitch end 28 connected by a web 30 to a base 31 which rests on top of adjustable mounting bracket 32 which is connected to the rear end 22 of drawbar 12. The hitch end 28 is provided with a hitch pin opening 33 having a wear sleeve 34. The hitch plate 26 is connected to the bracket 32 for pivotal movement by a pivot pin 35 comprised of a bolt 36 which is fitted through a bushing 38 and secured by nut 39. The bushing is slightly higher than the thickness of the base 31 in order that the bolt may be tightened against it while permitting free rotation of the hitch plate.

Figure 2:
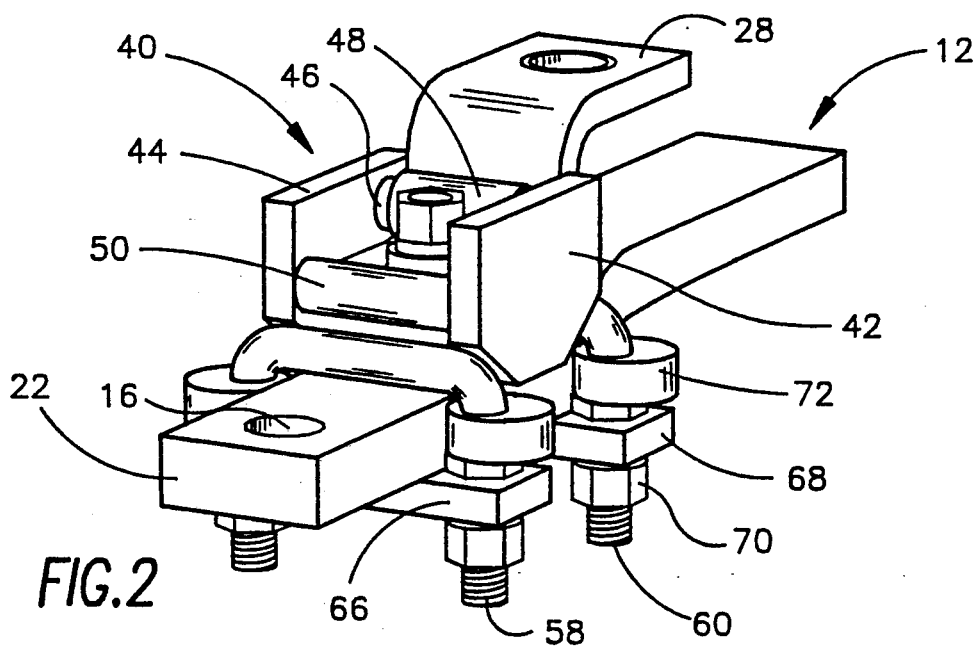
FIG. 2 is an enlarged pictorial view similar to FIG. 1 showing the hitch in the disengaged position.

A lock 40 is provided in order to lock the hitch in the engaged position shown in FIG. 1 and the disengaged position shown in FIG. 2. The lock is generally U-shaped or yoke-shaped and has stop elements 42 and 44 to prevent pivotal movement of the hitch plate in the engaged or disengaged positions.

Figure 3:
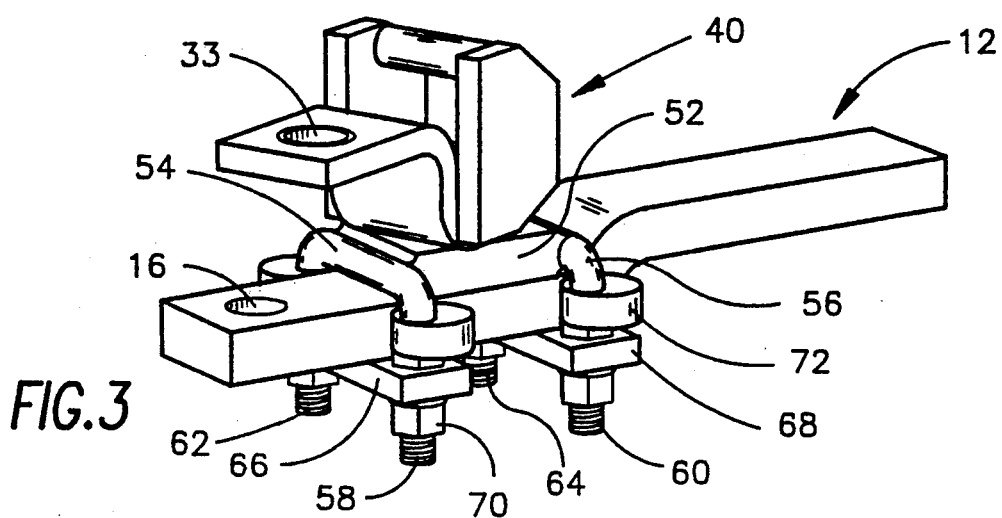
FIG. 3 is a pictorial view showing the hitch with the lock disengaged and an intermediate position of the hitch between the engaged and disengaged positions.

The lock is designed to be lifted easily from the locked positions shown in FIGS. 1 and 2 to the unlocked position shown in FIG. 3 and the dotted lines of FIG. 4 by pivotal movement about a shaft 46. The shaft 46 is connected at opposite ends to the stop elements 42 and 44 and is fitted through a sleeve 48 welded to the hitch plate. A rest also connected between the stop elements is provided by the rest bar 50 which holds the lock in the engaged position by resting above the drawbar.

The mounting bracket 33 provides for adjustment of the hitch to register the rear drawbar opening independent of the spacing of the two drawbar holes which may vary in different manufacturers or because of variance due to imperfect quality control.

It is adjustable along the length of the drawbar and is comprised of a support plate 52 which supports the bolt 36 and two U-shaped members 54 and 56. Legs 58 and 60 form one side portion and legs 62 and 64 form a second side portion which straddle the sides of the drawbar. Clamps 66 and 68 are clamped against the bottom of the drawbar by tightening nuts 70 on threaded ends of the legs.

In order to snug the side portions of the mounting bracket against the sides of the drawbar, cams or eccentric discs 72 are fitted on the legs through openings in the cams permitting rotation of the cams to engage the drawbar. The cams are engaged against the drawbar sides before the clamp bar 66 is tightened.

USE

The hitch plate is designed for simple attachment to the usual tractor drawbar 12 by simply connecting it to the mounting bracket. The bolt 36 connects the base of the hitch to the mounting bracket 32. After this connection the assembly of the hitch and mounting bracket are moved to slide the hitch in the hitch engaged position to register the hitch opening 33 in registry with the drawbar opening as shown in FIGS. 1 and 4. The cams 72 are engaged with sides of the drawbar and the clamp bars 66 and 68 are then tightened.

In the hitch engaged position the hitch end 28 and web 30 form a U-shaped yoke with the drawbar end 22 with openings 33 and 16 in registry. In FIG. 1 it is shown connected to the tongue 14 of an implement with a connecting pin 53 fitting through the hitch opening 33, a caged ball 54 at the forward end of the tongue and the drawbar opening 16.

The hitch is simply disengaged after the connecting pin has been removed by lifting the lock 40 to the position show in FIG. 3 and the dotted lines of FIG. 4 and pivoting it over the hitch disengaged position of FIG. 2. The lock is then dropped to the lock engaged position where the stop elements straddle the support plate. In the hitch disengaged position the hitch end extends over the bend 18 of the drawbar and closely overlies the forward portion 20 of the drawbar to minimize protuberances that might cause dangerous entanglement. When so disengaged the hitch leaves the rear opening 16 of the drawbar clear for any use as desired.

Various changes and modifications may be made within this invention as will be apparent to those skilled in the art. Such changes and modifications are within the scope and teaching of this invention as defined in the claims appended hereto.

What is claimed is:

1. A tractor drawbar and hitch for receiving a tongue of an implement, said implement being adapted to be connected to an implement connecting pin receiving hole in said drawbar, said hitch comprising a hitch member having adjustable connecting means for pivotally connecting it to said drawbar for rotary movement about a vertical axis between an engaged hitch position in which an implement connecting pin receiving hole in the hitch member is in registry with the pin receiving hole in said drawbar and a disengaged position to clear said hitch member hole from registry with said drawbar hole and a lock member pivotally connected to said hitch member for rotary movement about a horizontal axis, said lock member being moveable between a locked position in relation to said drawbar to lock said hitch member and an unlocked position in relation to the drawbar to free the hitch member for said rotary movement between said engaged and disengaged positions, said adjustable connecting means comprising a mounting member fitting upon said drawbar and being adjustable longitudinally upon said drawbar to present the implement connecting pin receiving hole in the hitch member in registry with the pin receiving hole in the drawbar.

2. The tractor drawbar and hitch of claim 1 in which said mounting member has clamping means surrounding a top and bottom and opposite sides of said drawbar to accommodate drawbars of varying thicknesses and widths.

3. The tractor drawbar and hitch of claim 1 in which said mounting member is comprised of a support plate supportable upon a top flat surface of the drawbar and having means for pivotally connecting said hitch member to said support plate.

4. The tractor drawbar and hitch of claim 3 in which said support plate is provided with an upstanding pivot means which receives the hitch member for pivotal connection between the hitch engaged and disengaged positions.

5. The tractor drawbar and hitch of claim 3 in which said mounting member includes bifurcated side portions extending on opposite sides of said drawbar, said side portions supporting bottom clamp means clamping said mounting member against a bottom of the drawbar, said side portions further include adjustable guides adapted to bear against opposite sides of the drawbar to provide a snug clamping of the mounting bracket against the top and bottom and sides of the drawbar, said side portions comprising legs straddling the sides of the drawbar and said guides comprise cams rotatably mounted upon said legs to bear against the opposite sides of the drawbar and said bottom clamp means comprise a cross member connecting bottom free ends of said legs and means for clamping said cross member against the bottom of the drawbar.

6. The tractor drawbar and hitch of claim 1 in which said mounting member includes bifurcated side portions extending on opposite sides of said drawbar, said side portions supporting bottom clamp means clamping said mounting member against a bottom of the drawbar.

7. The tractor drawbar and hitch of claim 6 in which said side portions further include adjustable guides adapted to bear against opposite sides of the drawbar to provide a snug clamping of the mounting member against the top and bottom and sides of the drawbar.

8. The tractor drawbar and hitch of claim 7 in which said side portions comprises legs straddling the sides of the drawbar and said guides comprise cams rotatably mounted upon said legs to bear against the opposite sides of the drawbar.

9. The tractor drawbar and hitch of claim 7 in which said side portions comprise legs straddling the sides of the drawbar and said guides comprise cams rotatably mounted upon said legs to bear against the opposite sides of the drawbar and said bottom clamp means comprises a cross member connecting bottom free ends of said legs and means for clamping said cross member against the bottom of the drawbar.

10. The tractor drawbar and hitch of claim 6 in which said side portions comprise legs straddling the side of the drawbar and said bottom clamp means comprises a cross member connecting bottom free ends of said legs and means for clamping said cross member against the bottom of the drawbar.

11. The tractor drawbar and hitch of claim 1 in which said mounting member is comprised of a support plate supportable upon a top flat surface of the drawbar and has means for clamping it against said top surface of the drawbar to accommodate drawbars of varying thicknesses and widths.

12. A tractor drawbar and hitch for receiving a tongue of an implement, said implement being adapted to be connected to an implement connecting pin receiving hole in said drawbar, said hitch comprising a hitch member having adjustable connecting means for pivotally connecting it to said drawbar for rotary movement about a vertical axis between an engaged hitch position in which an implement connecting pin receiving hole in the hitch member is in registry with the pin receiving hole in said drawbar and a disengaged position to clear said hitch member hole from registry with said drawbar hole, said adjustable connecting means comprising a mounting member fitting upon said drawbar and being adjustable longitudinally upon said drawbar to present the implement connecting pin receiving hole in the hitch member in registry with the pin receiving hole in the drawbar and said mounting member having means for clamping the mounting member against a top flat surface of said drawbar to accommodate drawbars of varying thicknesses and widths, said mounting member being comprised of a support plate supportable upon said top surface of the drawbar and having means for pivotally connecting said hitch member to said support plate.

* * * * *